United States Patent

[11] 3,611,952

| [72] | Inventor | James H. Hoffman<br>Mansfield, Ohio |
|---|---|---|
| [21] | Appl. No. | 883,481 |
| [22] | Filed | Dec. 9, 1969 |
| [45] | Patented | Oct. 12, 1971 |
| [73] | Assignee | The Mansfield Tire and Rubber Company<br>Mansfield, Ohio |

[54] MOLDED PALLET
4 Claims, 5 Drawing Figs.

[52] U.S. Cl. .................................................. 108/51,
108/53, 108/58
[51] Int. Cl. .................................................. B65d 19/18
[50] Field of Search ........................................... 108/51–58

[56] References Cited
UNITED STATES PATENTS

| 3,104,085 | 9/1963 | Skladany | 108/51 X |
| 3,140,672 | 7/1964 | DeLuca | 108/53 |
| 3,228,358 | 1/1966 | Sere et al. | 108/58 |
| 3,359,929 | 12/1967 | Carlson | 108/58 |
| 3,434,434 | 3/1969 | Horton, Jr. | 108/51 |

Primary Examiner—Bobby R. Gay
Assistant Examiner—Glenn O. Finch
Attorney—Meyer, Tilberry and Body ABSTRACT: A one-piece, nestable, four-way molded pallet having a deck defining a load-supporting surface, a plurality of hollow pedestals formed integrally with the deck and a network of channels also formed integrally with the deck. The pedestals and channels depend downwardly from the deck to define depressions therein and are located in a preferred arrangement to provide maximum structural rigidity for the pallet.

PATENTED OCT 12 1971 3,611,952

INVENTOR.
JAMES H. HOFFMAN
BY
Meyer, Tilberry & Body
ATTORNEYS

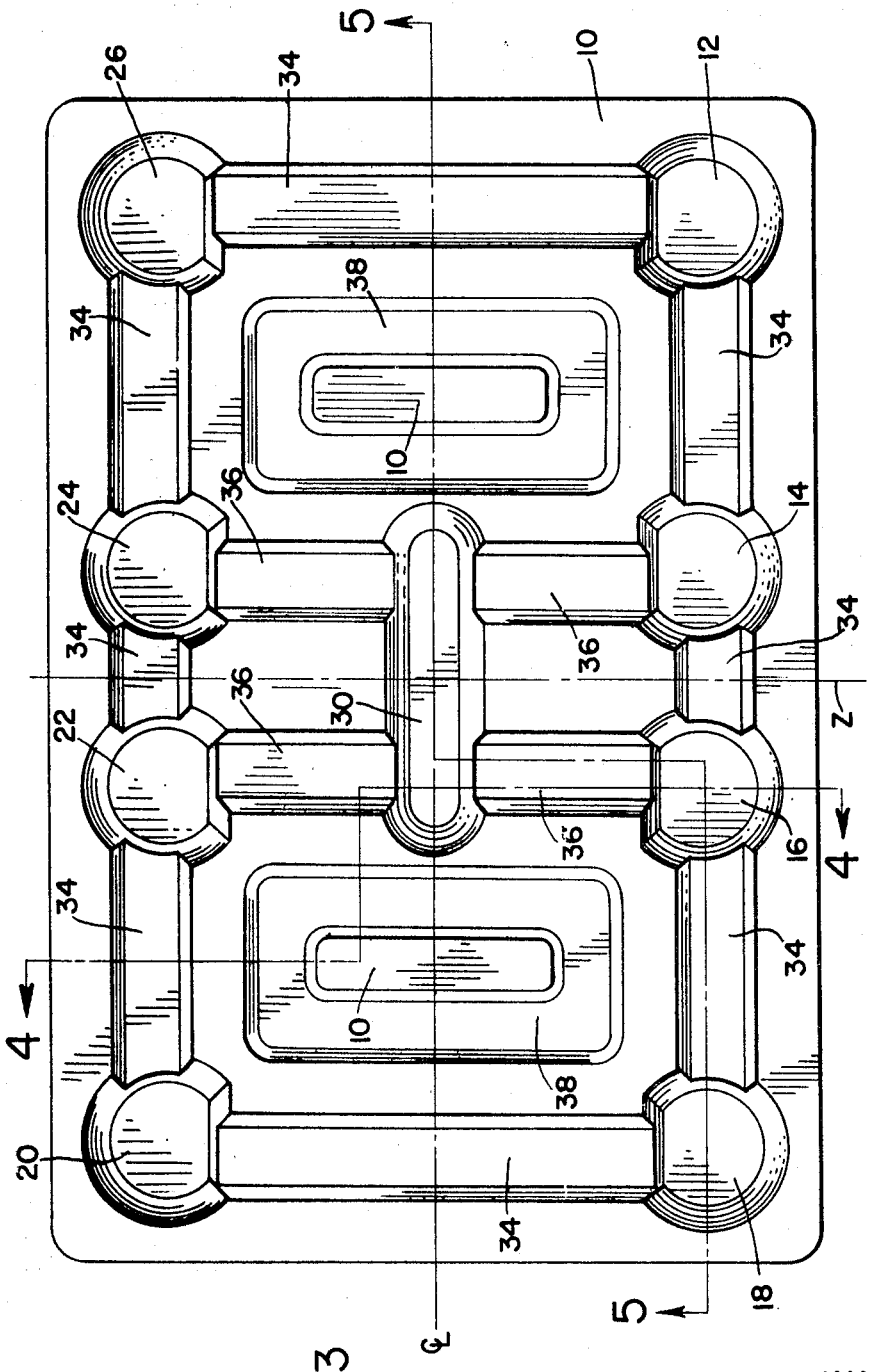
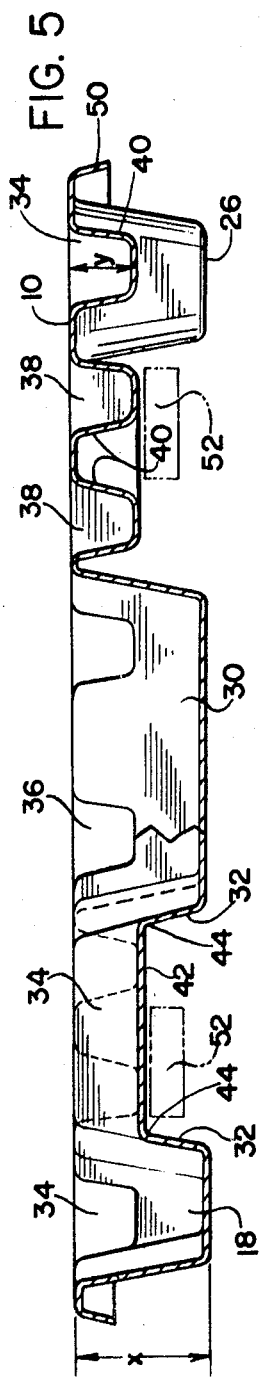

MOLDED PALLET

This invention pertains to the pallet art and more particularly to an improved nestable pallet of unitary construction.

The invention is particularly applicable to pallets of the type formed from molded fiber and will be described with particular reference thereto; however, it is to be appreciated that the invention has broader application and may be used with pallets constructed of metal or plastic.

Load-bearing pallets have been in use for many years and are designed to support a workload above a floor surface and thereby enable lift means, such as the tines of a forklift truck, to be received under the pallet for transporting it and the workload to various locations. Typically, such pallets are manufactured from either metal or wood; an example of a wooden pallet may be found in U.S. Pat. No. 2,369,944, issued Feb. 20, 1945.

Experience acquired throughout the years has indicated that metal and wooden pallets are unsatisfactory for a variety of reasons. Such pallets are heavy, cumbersome and relatively expensive, and as such are not economically disposable. Since these pallets are normally used to transfer materials from a source of supply to a consumer or distributor, it is often necessary to unload the pallets at the point of delivery in order to permit the return of the relatively expensive pallets to the supplier. This necessitates additional labor which increases the total cost of handling materials with these pallets. Wooden pallets are easily damaged, resulting in high repair and maintenance costs which often exceed the replacement cost. The wooden slabs of such pallets are subject to rot and germ-carrying fungus growths The screws and nails used in constructing such pallets may protrude and damage packaged goods carried on the pallets, or may fall out and cause serious damage to automatic pallet transfer equipment. The weight of such pallets, especially when water logged, is appreciable and is in no way reflected in the strength of the pallet. Additionally, metal and wooden pallets are not nestable and thus require excessive storage space when empty.

The present invention contemplates a new and improved pallet which overcomes all of the above-referred problems and others, and provides a one-piece, molded pallet which is lightweight, nestable, sufficiently inexpensive to be disposable after one use and simple to manufacture.

In accordance with the present invention there is provided a one-piece molded fiber pallet of the type adapted to be transported from place to place on the tines of a forklift truck, comprising: a deck defining a load-supporting surface having a continuous edge portion; a plurality of edge-supporting hollow pedestals formed integrally with the deck and located inwardly adjacent the edge portion; the edge-supporting pedestals depending downwardly from the deck a first distance to define depressions therein, whereby the deck is maintained at a preselected height above a base surface; a medially positioned, elongated, hollow pedestal formed integrally with the deck, the elongated pedestal depending downward from the deck a first distance to define a depression therein; a network of elongated channels formed integrally with the deck and interconnecting pairs of the pedestals, the channels depending downwardly from the deck a second distance to define depressions therein, the second distance being less than the first distance; and a pair of generally rectangular-shaped channels formed integrally with the deck, each of the rectangular-shaped channels being located in an area encompassed by the interconnection of some of the pedestals and elongated channels, the rectangular-shaped channels depending downwardly from the deck the second distance to define depressions therein, whereby the tines of the forklift truck are adapted to be received in the space intermediate the channels and base surface.

The principal object of the present invention is to provide an improved pallet of molded fiber and of the type adapted for use with forklift trucks or like devices.

Another object of the present invention is to provide an improved molded pallet which, while manufactured from lightweight and economical materials, is at the same time structurally strong and capable of supporting heavy loads.

Yet another object of the present invention is to provide an improved molded pallet which is of unitary, uncomplicated construction with resulting economy in manufacture.

A further object of the present invention is to provide an improved molded pallet which yields a splinter-free construction for safe handling and is of such a configuration that it can be stacked with other pallets in a nested manner to save storage space.

A still further object of the present invention is to provide an improved molded pallet which is sufficiently inexpensive that it may be shipped with the load material supported thereon and then disposed of at the point of destination.

An additional object of the present invention is to provide an improved molded pallet which may be divided into two equal segments of fully proportional strength in order to carry smaller or lighter loads.

These and other objects and advantages will become apparent from the following description used to illustrate the preferred embodiment of the invention when read in conjunction with the accompanying drawings in which:

FIG. 3 is a plan view of the molded pallet of FIG. 1;

FIG. 5 is a cross-sectional view taken along line 5—5 of FIG. 3.

Figure 1:
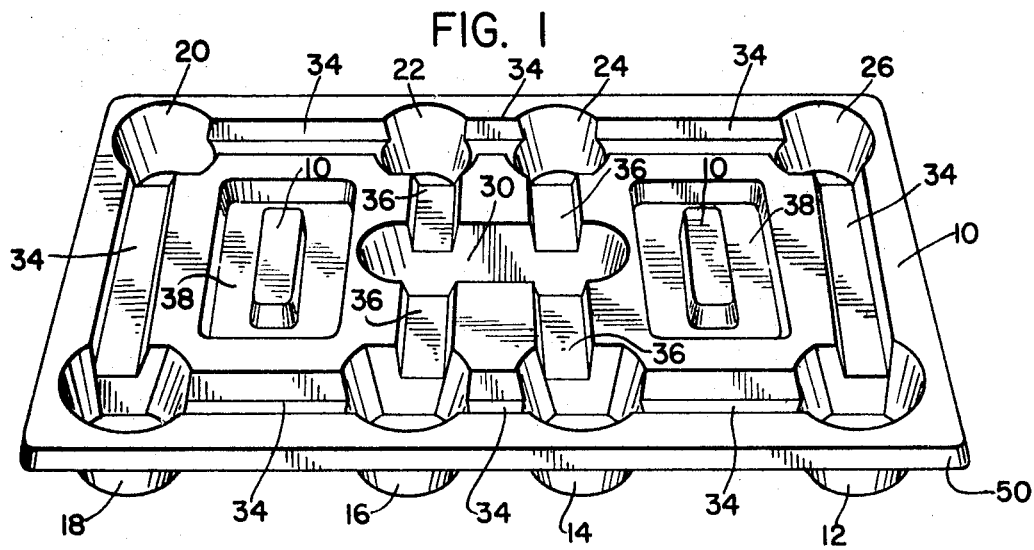
FIG. 1 is a top perspective of a molded pallet constructed in accordance with the preferred embodiment of the present invention.
Figure 2:
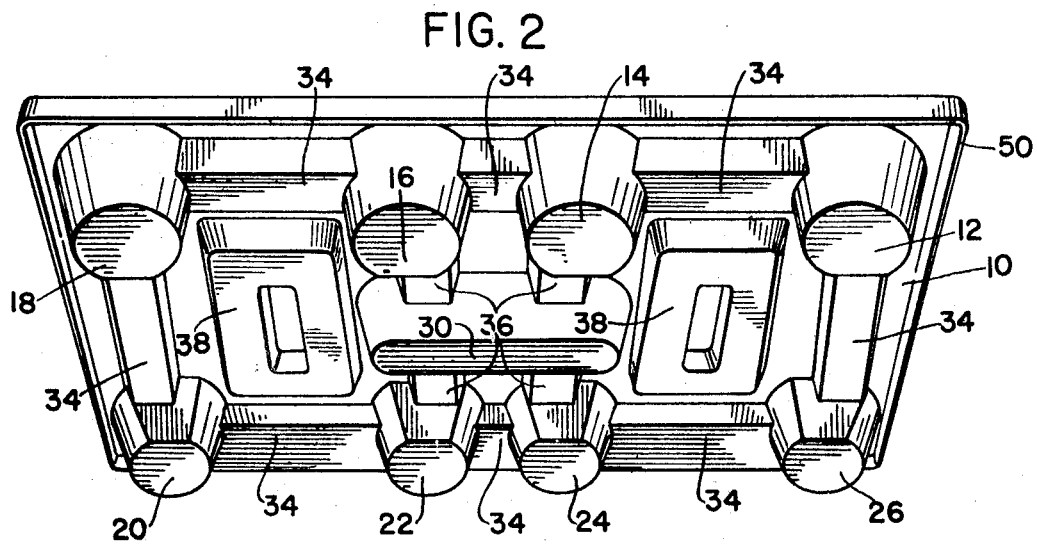
FIG. 2 is a bottom perspective of the molded pallet of FIG. 1.

Referring now to the drawings wherein the showings are for the purpose of illustrating a preferred embodiment of the invention only and not for the purpose of limiting same, FIGS. 1 through 3 show the overall arrangement of a molded fiber pallet constructed in accordance with the preferred embodiment of the present invention. The pallet includes a deck 10 defining a load-supporting surface upon which articles of varying sizes and weights may be placed.

Depending downwardly from the deck 10 to define depressions therein are a plurality of edge-supporting, hollow pedestals 12, 14, 16, 18, 20, 22, 24 and 26. The edge-supporting pedestals, referred to collectively by the reference letter A, though not so designated in the FIGURES, are formed integrally with the deck 10 and are located inwardly adjacent the edge of the deck at preselected, spaced-apart, positions. The edge-supporting pedestals A extend below the deck 10 a first distance, designated by the dimension $x$ (as shown in FIGS. 4 and 5), and maintain the deck at a predetermined height above a base surface such as a floor (not illustrated).

In addition to the edge-supporting pedestals A, there is further provided a medially positioned, elongated, hollow pedestal 30. The elongated pedestal 30 is formed integrally with the deck 10 and depends downwardly therefrom to define a depression therein. The elongated pedestal 30 extends below the deck 10 a first distance $x$. In this manner, it provides additional support to the midsection of the pallet and aids in maintaining the deck 10 at a preselected height above the base surface.

Figure 4:
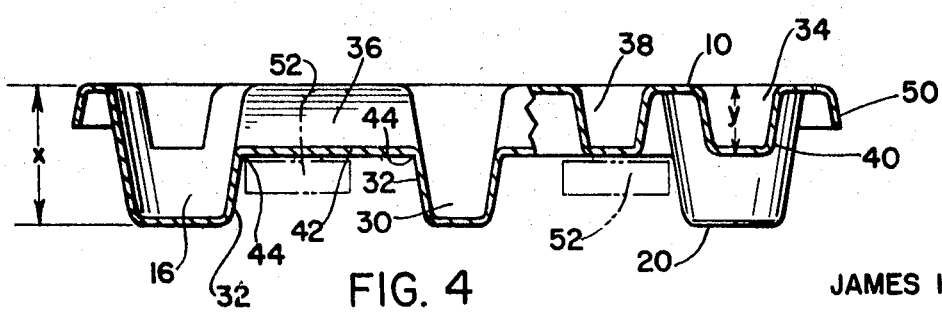
FIG. 4 is a cross-sectional view taken along line 4—4 of FIG. 3.

The edge-supporting pedestals A and the elongated pedestal 30 are comprised of a wall 32 inclined from the vertical so as to impart a tapered shape to the pedestal (as illustrated in FIGS. 4 and 5). As such, the upper portion of the pedestal has a greater cross section than does the lower portion of the pedestal.

In order to increase the structural rigidity of the pallet, there is provided a network of elongated channels, referred to collectively by the reference letter B though not so designated in the FIGS. The elongated channels are formed integrally with the deck 10 and extend downwardly therefrom a second distance, designated by the dimension $y$, to define depressions therein. A first series of channels 34 interconnects adjacent edge-supporting pedestals A and are substantially parallel to the edge of the deck 10. For example, a channel 34 interconnects edge-supporting pedestals 18 and 20. A second series of elongated channels 36 interconnects the edge-supporting pedestals 14, 16, 22 and 24 to the elongated pedestal 30. For example, an elongated channel 36 interconnects edge-supporting pedestal 16 to elongated pedestal 30. A third series of channels 38, generally configured to form a rectangle are located in an area encompassed by the interconnection of some of the edge-supporting pedestals A and first and second series elongated channels 34, 36. Thus for example, one generally rectangular-shaped channel 38 is encompassed by edge-supporting pedestals 16, 18, 20 and 22 as well as, elongated pedestal 30 and some of the first series channels 34 and some of the second series channels 36. The rectangular channel 38 surrounds a segment of the deck 10, thereby preventing a large portion of the load (not illustrated) from going unsupported.

The elongated channels B have walls 40 which are inclined to the vertical so as to impart a tapered configuration to the channels. The inclination is such, that the top portion of the channels B is larger in cross Section than the lower portion of the channels. As best illustrated in FIGS. 4 and 5, the bottom 42 of the channels B meets wall 32 of the edge-supporting pedestals A and elongated pedestal 30 at a point 44, which is a distance y below the surface of the deck 10.

In order to increase the structural rigidity of the pallet, there is provided a lip 50 which is formed integrally with the deck 10 about its edge portion and extends generally downwardly therefrom. Although a lip 50 has been shown, it is to be appreciated that the pallet possesses sufficient rigidity to function effectively and hence the lip could be eliminated. However, it is to be further appreciated that the downward extent of the lip 50 can vary, depending upon the magnitude of the lateral strains imposed by the strapping of the load to the pallet.

In order to prevent the accumulation of water in the pedestals A and the channels B when the pallet is stored outside, a plurality of drain holes (not illustrated) may be provided in the bottom wall of each of these members. Proper drainage of rainwater increases the useful life of the pallet, thereby reducing replacement costs.

As best shown in FIG. 3, the pallet has a transverse axis, designated by the reference other, z, which bisects the structure into two equal and symmetrical pallet segments. All of the edge-supporting pedestals A are located outside of a plane which passes through the transverse axis z. Therefore, the two equal pallet segments are completely self-supporting and capable of carrying the load in relation to their respective deck areas. As such, the pallet may be divided along the transverse axis z during the molding operation, thereby producing two equal pallet segments. This unique feature is quite advantageous when the load which the pallet is to carry only requires a deck surface having approximately one-half the area of the entire one-piece, molded fiber pallet. The end result of the foregoing procedure is to yield a more economical pallet which may be readily disposed of rather than stored, or returned to the sender for further use.

Another important feature of the invention is that the molded pallets are nestable, one within the other and thus occupy a minimum amount of space during storage or shipment when empty. As heretofore discussed, the edge-supporting pedestals A, the elongated pedestal 30, and the elongated channels B are all tapered, that is, they tend to converge as they extend downward from the deck 10 a first or second distance respectively. This configuration makes it possible to nest one pallet within the other.

The distance between the base surface upon which the pallet rests and the bottom of the elongated channels B, represented dimensionally by the equation x minus y, provides space into which the tines 52 of a forklift truck are adapted to be inserted. The pallet is of the four-way entry type and is designed to be dimensionally capable of receiving the tines 52 in either a direction parallel to the transverse axis z (as illustrated in FIG. 5) or in a direction perpendicular to the transverse axis (as illustrated in FIG. 4). When the tines 52 are inserted beneath the pallet in a direction parallel to the transverse axis z, they will be in contact with the bottom wall 42 of the elongated channels 34 and the rectangular channel 38. However, if the tines 52 are inserted beneath the pallet in a direction perpendicular to the transverse axis z, then they will be in contact with the bottom wall 42 of the elongated channels B. Regardless of the direction of insertion, the pallet possesses sufficient rigidity to prevent deflection while being conveyed by a forklift truck.

Although a variety of methods could be employed for manufacturing the pallet, preferably the process involves the molding of fibrous materials. Being more specific, a perforated female form of preselected shape is provided and a dilute slurry of kraft and mechanical wood fibers is then pumped against the form. The application of this positive pressure on the form causes the water bearing the fibrous material to be drawn through the form leaving a fibrous deposit on the outside of the form. The amount of fibers so collected is controlled by the magnitude of the pressure and the period of time during which the slurry is deposited. The fibrous wet mat thus formed is transferred to a second station and placed on a similarly configured perforated male form. A flexible squeeze bladder is hydraulically pressed against the wet mat, thereby removing the excess water. In this manner the fibers produce a pallet of predetermined thickness; said thickness being generally constant throughout the extent of the pallet. The wet form is then hot-molded at a preferred temperature of approximately 250° C. The pallet so made, which is now of the right shape, size and thickness, may then be dipped in a solution of spirits and resin. In some applications only the bottoms of the pedestals will be dipped and the dipping solution may contain waxes in addition to, or in place of the resins. This latter method provides a means for imparting additional rigidity and/or water absorption resistance. If drain holes are to be included as heretofore described, they are punched prior to the after-dip process. Lastly, the pallet is cured in an oven at a preselected temperature.

Although the invention has been described with reference to specific embodiments, variations within the scope of the following claims will be apparent to those skilled in the art.

I claim:
1. A one-piece molded pallet of the type adapted to be transported from place to place on the tines of a fork truck, said pallet comprising:

a generally rectangular deck area defining a load-supporting surface, said deck area including a continuous edge portion extending therearound, two of the opposed edge segments of said continuous edge portion being longer than the other two opposed edge segments;

a plurality of hollow edge and corner-supporting pedestals, each of said pedestals depending downwardly from said deck area a first distance whereby said deck area is supported above a base surface by said first distance, said plurality of pedestals being spaced around said deck adjacent said continuous edge portion with at least one of said plurality of pedestals being disposed at each corner of said deck area and at least two of said pedestals being disposed along and adjacent to each of the two said longer of said edge segments;

an elongated, hollow, downwardly depending, medial pedestal extending generally parallel with said two longer edge segments, said medial pedestal extending downwardly a distance equal to said first distance;

a plurality of channels in said deck area extending between and interconnecting said plurality of pedestals and said medial pedestal, each of said channels being parallel to an adjacent segment of said continuous edge portion whereby said deck area is divided into two substantially equal rectangular areas, said channels depending downwardly from said deck area a second distance less than said first distance; and a generally rectangular shaped channel inside and coextensive with each of said two rectangular areas, said rectangular-shaped channels depending downwardly from said deck area a distance equal to said second distance.

2. The molded pallet defined in claim 1, further including a stiffening member integral with and extending generally downward from said deck about said edge portion.

3. The molded pallet defined in claim 1, wherein said generally rectangular deck area includes a longitudinal axis and a transverse axis, said pedestals and channels being disposed substantially symmetrical about said axes, each of said at least two of said pedestals disposed along each of said longer of said edge segments being on opposite sides of a plane passing through said transverse axis for permitting said pallet to be divided therealong into two substantially equal, self-supporting pallet segments.

4. The pallet as defined in claim 1 wherein said pallet is molded from a fiber material.